(12) United States Patent
Heino et al.

(10) Patent No.: US 7,729,291 B2
(45) Date of Patent: Jun. 1, 2010

(54) SYSTEM AND METHOD FOR REDUCING TRAFFIC IN A WIDE AREA ETHERNET NETWORK

(75) Inventors: Flemming Heino, London (GB); Jason Velody, London (GB); Sarit Chhatralia, Middlesex (GB); Daniel Hawkins, London (GB)

(73) Assignee: PacketExchange, Inc., London (GB)

( * ) Notice: Subject to any disclaimer, the term of this patent is extended or adjusted under 35 U.S.C. 154(b) by 211 days.

(21) Appl. No.: 11/975,484

(22) Filed: Oct. 19, 2007

(65) Prior Publication Data

US 2009/0103436 A1   Apr. 23, 2009

(51) Int. Cl.
*H04L 12/28* (2006.01)

(52) U.S. Cl. .................................................. 370/254
(58) Field of Classification Search ................... None
See application file for complete search history.

(56) References Cited

U.S. PATENT DOCUMENTS

2006/0268739 A1 * 11/2006 Garcia et al. ................. 370/254
2007/0165865 A1 *  7/2007 Talvitie ....................... 380/286

* cited by examiner

*Primary Examiner*—Steven H Nguyen
*Assistant Examiner*—Alex Skripnikov
(74) *Attorney, Agent, or Firm*—Innovation Partners; Charles E. Gotlieb (57) ABSTRACT

A system and method retrieves device forwarding information from switching devices and installs it as static device forwarding information on other switches to prevent multiple copies of communications being sent from those switches.

21 Claims, 4 Drawing Sheets

SYSTEM AND METHOD FOR REDUCING TRAFFIC IN A WIDE AREA ETHERNET NETWORK

FIELD OF THE INVENTION

The present invention is related to computer networking and more specifically to wide area Ethernet networking.

BACKGROUND OF THE INVENTION

Ethernet switching devices, such as switches, routers and the like, maintain the information required to directly forward Ethernet messages to the proper port on that switch for only a limited amount of time, such as three minutes. Ethernet switching devices may include devices whose primary purpose is to operate as Ethernet switches, as well as devices that have a different primary purpose, but can also perform some or all of the conventional Ethernet switching functions.

The information used to send a message from device A to device B is identified from messages that previously traveled in the other direction, that is, using messages that were sent from device B to device A. If the switching device does not know how to forward the message, the message will be sent to many virtual or physical connections supported by that switch until the proper path is determined in either direction. Virtual connections are supported by logical ports and there may be more than one logical port supported by a physical port. Because each physical port may support multiple logical ports, and because the switching device will send the message to each logical port, when logical ports share the same physical port, this process takes even more of the bandwidth for each physical port and on the network. This flooding of traffic can significantly multiply the traffic impact of a message on the network. (The use herein of the term flooding is different from the strict definition of flooding, in which traffic is generated to every port, physical or logical, other than the port from which the message was received. Ethernet flooding is somewhat more intelligent and so the message may not go out over every port, but may go out over many ports or more than one port).

The more switches there are between the destination and a switching device, the less likely that switching device will have recently received a communication from that destination device, and therefore that switching device will not know how to route messages to that device as a destination. When other switching devices that do not know how to route the message receive the message, they will flood the message to other active logical ports on the switch (except the port on which the message originated and other ports in the direction of the source), causing the message to be received by many devices on the network that are not on the best path from the source of the message to its destination. In a full mesh network, in which each switching device is coupled to every other switching device, such flooded messages can traverse a significant portion of the network. The devices will also receive the message before determining that the message is not for them, impacting the available network bandwidth for that device and, if charges are assessed for bandwidth used, raising the costs borne by each device for receiving traffic that they do not wish to receive. Thus, not only is there an adverse effect on the network traffic, there can also be an adverse effect on every device in the network. In a network in which customers pay for traffic, it can be a significant added expense when traffic is flooded in this manner.

Sometimes, none of the switches will have any forwarding information for a device even if several messages are sent to that device. For example, if messages are sent in only one direction, from device A to device B, but no messages are sent in the reverse direction, each message may be flooded by a number of switching devices in the path from A to B, because they will never have received a message from device B. Thus, the flooding problems can recur in message after message.

In a conventional wide area Ethernet network, routers may generate a significant amount of traffic over the Ethernet network of switching devices. If the routers send conventional messages to one another, the first such message (typically an ARP message, but other types of messages may be used as an initial message) will be flooded, but subsequent messages (typically routing messages, such as BGP messages or OSPF messages, but again other types of messages may be sent) will be sent using a single path, if the routers are set up to send the subsequent messages more frequently than the Ethernet switching devices discard the paths. When the routers send other communications to one another, again the messages will not be flooded by the Ethernet switching devices because such messages will cause the switching devices to always retain the proper port identifier to use to send a message from one router to another. Thus, only the first such message is flooded. Because the initial message is short, typically 64 bytes, the flooding of such a router to router message does not generate large amounts of traffic and is considered an ordinary part of the traffic in an Ethernet network.

When routers communicate using conventional methods, the routers arrange point to point communications to each of the other routers with which that router will communicate. As the number of routers grows, the point to point communications can cause too much overhead to be maintained, and so another solution may be used for subsequent messages, such as BGP messages or OSPF messages. This other solution uses one or more route servers to communicate with each of the routers in the network. BGP or OSPF messages are sent only to the route server by each of the routers and the route server distributes them to the other routers, keeping the overhead on each router low. However, because the keepalive messages from any router are shunted to a route server, other switching devicees will not receive the BGP messages from each router, and thus the return path to a router will not be known by any switching device not in the path between a router and the route server it uses when it is time for one of the routers behind any such switching device to send messages to that router.

Thus, many many messages will be flooded, and those messages may be significantly larger than 64 bits. The impact on the network, and the impact on traffic paid for by the customer, can thus be significant when a carrier migrates to route servers.

It can be difficult to manually maintain information about a network, because devices can be disconnected from the network and reconnected for various reasons. It can be desirable for any solution to the above problem to be automatic, so that information about devices coupled to the network does not have to be manually entered and changed.

What is needed is a system and method that can reduce the need to flood messages in a network such as an Ethernet network when route servers are used that is managed in an automated fashion.

SUMMARY OF INVENTION

A system and method arranges the network to ensure that each router on the network is frequently transmitting messages, such as BGP messages, OSPF messages or other messages, through the switch in front of it on the wide area network, causing that switch to retain path information to that device. For example, the route servers may be attached to at least one wide area network switch to force messages to flow through the network switch. Although switches and messages are described herein, the present invention applies to any switching device, including devices that also, or primarily, perform other functions, and applies to any form of message. The edge switches are then periodically queried to identify all of the local entry (e.g. those corresponding to local switches, devices that sit behind the local switches, or route servers) device identifiers (e.g. MAC addresses) for each device supported by that switch, and the device identifiers are stored, associated with the corresponding identifier (the management IP address of the switch, its switch identifier, or both) and the date and time the query took place. In one embodiment, retrieval of the information from a switch as described herein may be performed so that at least one device identifier can be added to the forwarding table of a different switch as described herein.

After each such query, the data retrieved from the edge devices are compared with a list for each switch. The list contains the MAC addresses or other device identifier of the devices behind each switch, and the last time that device was retrieved from the list of devices behind that switch. Devices recently reported by the switch, but not on its list are added, associated with the switch from which the information was retrieved, and identified as "new." The time each device was last reported is updated on the list using the timestamp associated with that switching device, and any devices on the list having such a time that is older than a threshold are identified as "gone."

The system and method contacts each switch and, for each device identified as "new", adds to the switch's table of devices of which it is aware, as a remote entry, device identifiers and a connection identifier for the connection to the switch supporting that device, and removes device identifiers identified as gone, with the exception that such identifiers are not added to, or removed from the switch with which the device is associated on the list. The addition as a remote entry prevents such added entries from being retrieved and copied to another switch, as such entries are not retrieved, yet the switch will use it for routing purposes in the same manner as the local entries it added itself. Unlike the entries the switch added itself, such entries are added from an external source implementing the system and method.

The information for the devices are added to, and removed from, the same forwarding table that the switch will use when attempting to route communications. Additions are made as "static" entries, so that their information will not automatically expire. At least one added device identifier may not have been installed in the forwarding table of the switch onto which it is installed as described herein, or may not have been installed as a static entry, on that switch at the time of installation. Information is removed from a switch onto which that information was added as described herein.

When a switch that was the source of the information for a device removes that device as a local entry, the system and method may wait before removing it from the other switches so that if the switch adds the device again, it will not be removed and added by the system and method. Thus, each switch will have the connection identifier and device identifier of some or all of the devices in the network. However, devices that disappear briefly from the edge switch will not cause the device to be removed until they have not reappeared for a threshold amount of time.

The next iteration is then scheduled, and when the scheduled time occurs, the process described above will be repeated from the point of querying the switches.

Once the system and method has operated as described above for at least one iteration, when the switch attempts to send a communication to a device from which it has not received a communication, it will already have the destination of the communication in its forwarding table, so it will not flood even the first communication, but will send it to the switch that supports the destination of the communication.

Because device information is detected automatically, as devices are connected to the network or disconnected from the network, the system and method updates the device information automatically, without any input from a system administrator.

DETAILED DESCRIPTION OF A PREFERRED EMBODIMENT

Figure 1:
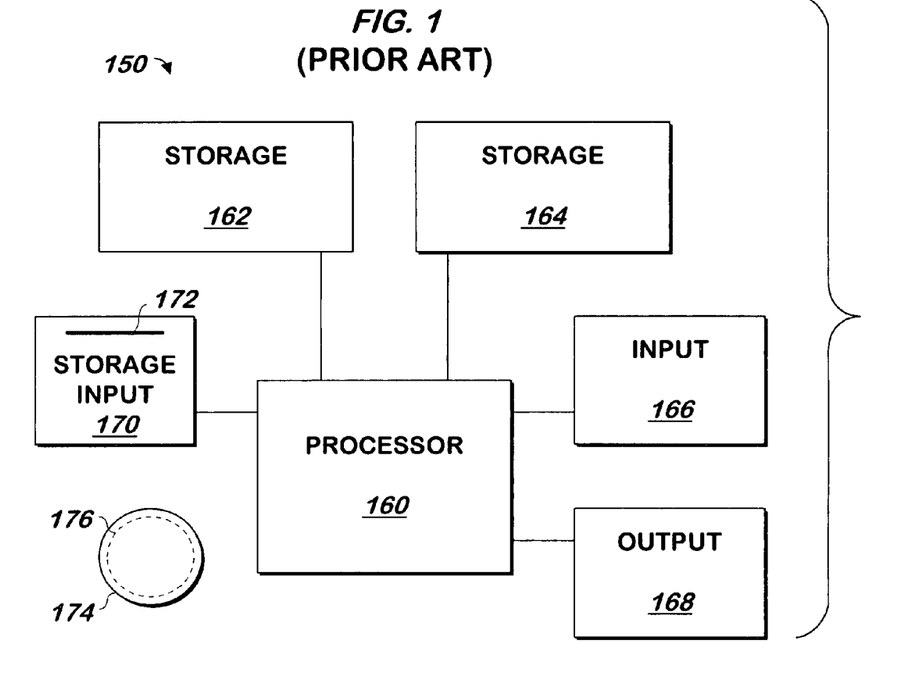
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE INCORPORATED of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2A:
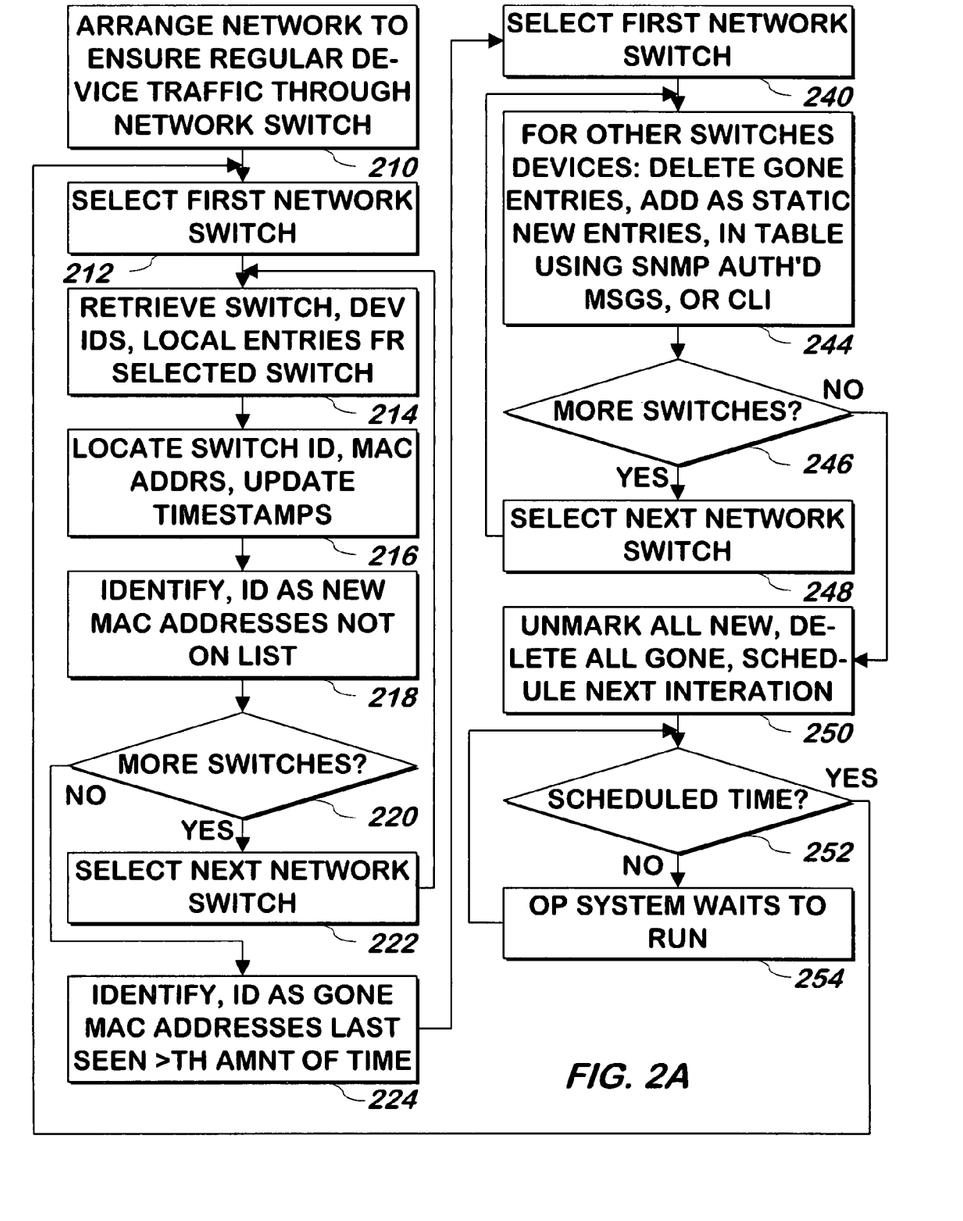
FIG. 2A is a flowchart illustrating a method of updating a table used to provide Ethernet communications according to one embodiment of the present invention.

Referring now to FIG. 2A, a method of providing device/switch associations is shown according to one embodiment of the present invention. Although switches are described herein, they are but one type of switching device, and any switching device, including routers, may be used in place of any switch described herein according to the present invention. Any device that performs conventional switching functions is a "switch" or "switching device" as used herein, whether the device performs such functions as its primary function, like a conventional Ethernet switch, or as a supplement to its primary function, like some conventional routers (for example, those acting as switches) and some conventional SONET/SDH transmission equipment. The switching functions may include switching conventional Ethernet communications or other types of communications.

Figure 3:
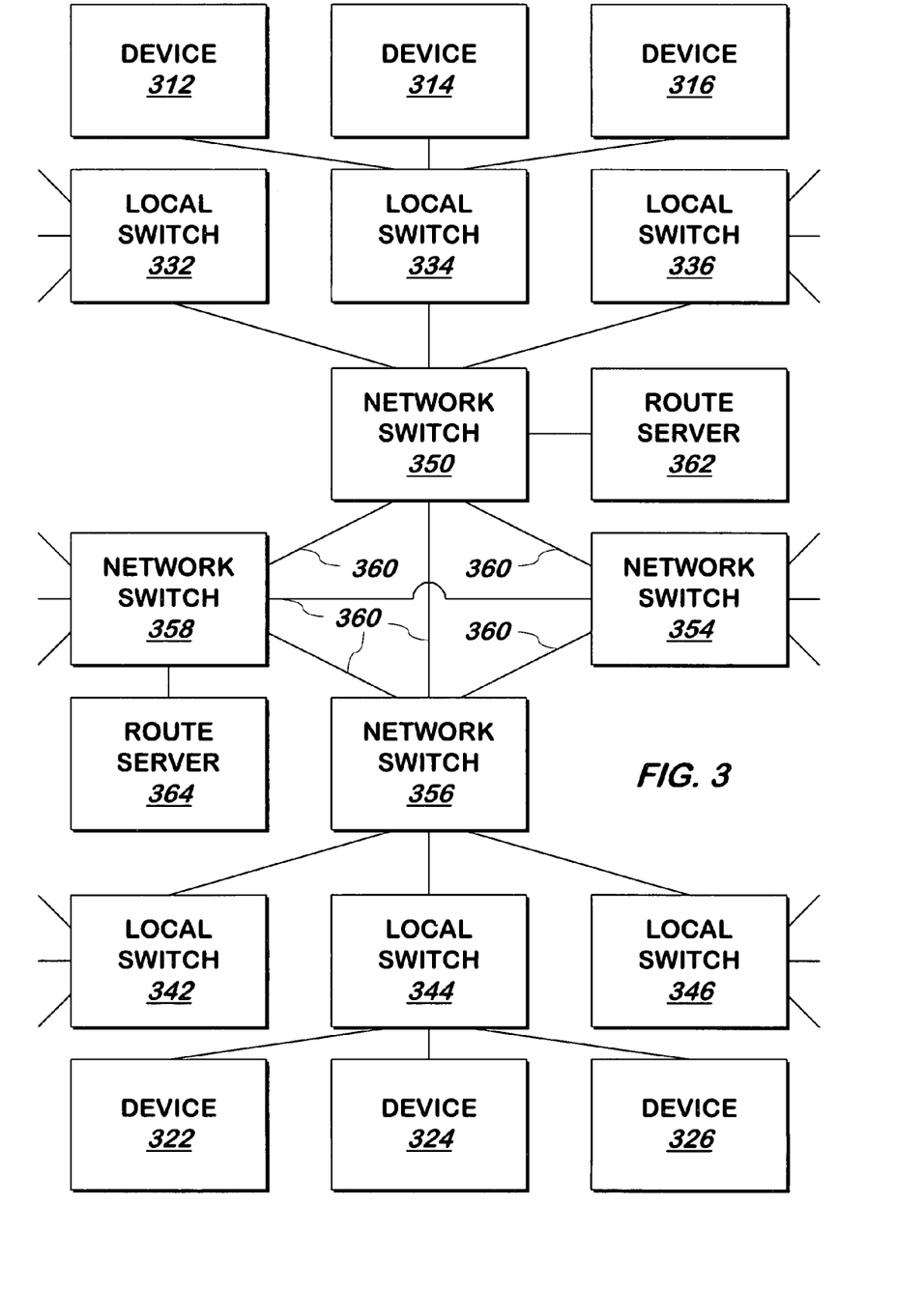
FIG. 3 is a block schematic diagram of a network containing switches, which may include any form of a conventional switching device, and devices, which may include conventional routers.

A network is arranged 210 to ensure that each device repeatedly provides at least one communication through at least one network switch during each period in which, if no such message is received, the network switch would ordinarily remove the device from its table. In one embodiment, to implement a network, devices are arranged as shown in FIG. 3. As described herein, the devices are routers running BGP, and the switches are telecommunication devices (e.g. switches or routers) acting as Ethernet switches, though the present invention will operate with other protocols and other types of devices. Route servers are conventional route servers.

Referring momentarily to FIG. 3, devices 312, 314, 316, are coupled to local switch 334. Local switch 334 is connected to network switch 350, which is connected to route server 362. Devices 312, 314, 316 communicate with route server 362 via network switch 350, for example by sending BGP or OSPF routing and keep alive messages to route server 362 via network switch 350. The route server 362, 364 with which each device communicates is placed behind a network switch 350, 354, 356, or 358. Devices 312, 314, 316 communicate with route server 364 via network switches 350 and 358, for example by sending BGP or OSPF routing and keep alive messages to route server 364 via network switches 350 and 358. Network switch 350 is configured to be the only network switch that identifies devices 312, 314, 316 as local entries in its forwarding table. A because the BGP or OSPF keep alive messages transit network switch 350 to reach route server 362, network switch 350 will always maintain device identifiers of devices 312, 314, 316 in the network switch table of devices of which it is aware. Network switch 350 thus fronts devices 312, 314 and 316 to network 360.

Devices 322, 324, 326 similarly transit messages through local switch 344 and network switch 356 to reach network 360, which may be a wide area network, local network, or both or any other size network. Keep alive and other conventional BGP messages from devices 322, 324, 326 transit network switch 356, and network switch 358 to reach route server 364, and transit network switches 356 and 350 to reach route server 362. Thus, network switch 356 will maintain identifiers of devices 322, 324 and 326 in its forwarding table as local entries, but network switch 354 will not be aware of devices 322, 324, 326 via those devices' keep alive messages sent to route servers 362 or 364. Other local switches are shown such as local switch 332, 336, 342 and 346, which would serve other devices not shown. Other networks switches 358, 354 may be coupled to other devices or local switches not shown. In this embodiment, each network switch 350-358 would be queried as described above, because each network switch 350-358 is at the edge of the network switch network.

Communication among devices is via the paths shown in the Figure. For example, network switches 350, 354, 356, 358 communicate with one another via network 360. Some or all network switches may run the conventional Multiprotocol Label Switching (MPLS) protocol, though other protocols may be used. Virtual connections may be provided under MPLS in one embodiment. MPLS is described at the Web site wikipedia . org/wiki/Multiprotocol_Label_Switching (with the spaces before and after the '.' Removed).

Other arrangement may be used. For example, local switches 332-336 and 342-346 need not be used, with any or all of devices 312-316 and 322-326 being coupled to a network switch, such as 350 or 356, or such devices 312-316 and 322-326 may be coupled to network switches 334, 356 via several layers of local switches (such several layers not being shown in the Figure.

Other arrangements not shown in the Figure, but those that could be used, include additional one or more tiers of network switches, for example, with one tier feeding into a higher-level tier, to avoid the $n^2$ connectivity issue with all network switches coupled to all other network switches. Each of the lower level tiers may consist of several networks, coupled to one another via a higher level tier. As described in more detail below, the present invention may be applied to the highest level tier and applied again to each of the lower level tiers that have switches that messages from one or more devices may not pass through. All such switches may include conventional switching devices, such as routers.

It is noted that network 360 may consist of logical connections, which actually transit other switches (not shown), which may also include other switching devices, but that are not considered to be network switches. Such other switches may be under the administrative control of the same entity as the one controlling network switches 350-358 or a different entity. The present invention need not be applied to such other switches, though it could be.

Referring again to FIG. 2A, the first network switch at any edge of a network is selected 212. In one embodiment, the edge network switches are listed in a table of all such edge network switches. The table may be populated by a system administrator, or discovered. The system administrator may supply to the table the management IP address used to obtain information by the switch, and an indication of the manufacturer or the type of the network switch. The types indicate whether the switch internally refers to other switches using their switch identifiers or uses a different identifier. The reference by one switch to another switch is referred to as that switch's connection identifier for the other switch. The table may also contain spaces for the switch identifier, the identifier each switch uses to represent itself to the other switches, and the MAC address of each switch.

The network switches need not be selected in any particular order, as the "first" network switch may be simply the first network switch listed in the table of each edge switch. The switch identifier and device identifier of the switch is retrieved 214 from the switch and stored in the table, if not already stored in the table.

As used herein, a switch identifier is the identifier of a switch that is used to uniquely represent the switch in the context of it performing its switching functions. The switch identifier may be any or all of an IP address assigned to the switch, or a MAC address on the switch that is used to represent the switch to other switches. It is sometimes referred to as a Switch ID. The management IP address of the switch is the IP address used to access the switch to perform management functions optionally, after logging in to the switch. It need not actually be an IP address, as some embodiments may use other identifiers.

The device identifiers (e.g. MAC addresses) of devices of which that network switch is aware as local entries are retrieved from the selected network switch 214. Local entries are those that the network switch has added as a result of conventional network operations, independent of the present invention, based on communications from devices to which it fronts the network, but no others. Local entries are those corresponding to devices 312-316, 322-326, local switches 332-336, 342-346 or route servers 362, 364, and are in contrast to remote entries, which refer to other network switches 350-356.

In one embodiment, the retrieval of information described above may be performed via conventional SNMP commands, conventional CLI commands, conventional XML based streams of text including those provided using conventional web services techniques, or other conventional management techniques. In one embodiment, step 214 includes optionally logging into the selected network switch, and optionally logging out of any previously selected network switch. An access type entry in the table, provided by the system administrator or discovered as described below may be used to determine the type of access and whether a login should be used.

As described herein, a list of local entries from multiple edge switches on the network is maintained. Each entry contains the switch identifier of the switch from which the local entry was retrieved, the device identifier of the device corresponding to the local entry, and last retrieved a timestamp. The last retrieved timestamp for any stored entry on that list having the same switch identifier and device identifier as those just retrieved is updated to reflect the current date and time 216 or a date and time nearly current.

Any retrieved device identifier not already stored in the list as associated with that switch identifier is stored in the list as a new entry containing the switch identifier, device identifier and the date and time of last retrieval 218. As part of step 218, in one embodiment, such new entries in the list are further marked as new, for example, by storing in the list with the other information the date and time each such new entry was initially retrieved from that switch, or by using another indicator. If there are more switches in the table 220, the next network switch at the edge of the network is selected 222, and the method continues at step 214 using the selected network switch.

It is noted that at least one retrieved device identifier may not be installed as a static entry or as any entry in the forwarding table of at least one other switch on the network, and thus the purpose of the retrieval is so that it may be installed in the forwarding table of another switch on the network as described herein.

It is noted that, at least for some devices, a device marked as new will not be installed as a static, remote entry on at least one other switch in the network. Thus, the identification of a device as new, also identifies the device as one that is not statically installed in the forwarding table, at least associated with that switch identifier, on at least one other switch in the network. If the device identifier and switch identifier is not installed on such at least one other switch, one or more messages destined for that device will be flooded by such other switches. The identification of such devices as new is thus an identification of such devices as those that should be installed in the forwarding tables of such other devices to prevent such flooding.

If there are no more switches 220, the entries are scanned to identify any device identifiers for which the timestamp on the list associated with such device identifier exceeds a threshold amount of time from the current time 224. The threshold may be any positive number and may be received from a system administrator. The threshold may be defined to be of sufficient length that a device that is briefly unplugged and then replugged back in will not be identified as gone. The entries on the list for such device identifiers are optionally identified as "gone" on the list as part of step 224. In one embodiment identifying an entry as gone may be made by marking the entry. In another embodiment, no such explicit marking is performed, as an entry may be identified as gone using the timestamp indicating the last retrieval time, as well as the current date and time as described below. The method continues at step 240.

The identification of a device identifier as "gone" is an identification of a device as one that is no longer communicating with the switch with which it is associated as a static, remote entry in the forwarding table of at least one other switch. If the device is still communicating with the network, it should be reached by a different switch, and thus, its association with the switch is no longer valid, and communications should either be redirected via a different static entry associating the device with a different switch with which it has already communicated, or should be flooded in order to reach it.

At step 240, the first network switch identifier is selected on the list. It is noted that the first network switch identifier is selected from among all network switches, not just those at the edge of the network, although in one embodiment, every switch in the network is an edge switch. Using SNMP, CLI, XML or other conventional techniques, for example as indicated in the table devices that are identified as new on the list for switches other than the one corresponding to the selected switch identifier are installed as static, remote entries in the forwarding table in the switch corresponding to the selected switch identifier 244. The forwarding table is the table that is used by the switch to route messages between switches and between the edge switch and the devices each such switch fronts to the network. New entries are added as remote entries, which allows the present invention to distinguish between entries added as a result of the present invention and entries added for reasons other than being added as a result of the present invention, though other manners of making such distinction may be employed. New entries are added as "static", so that those entries will remain on the switch onto which they are installed after the timeout period, after which non-static entries could be discarded by the switch.

As part of step 244 entries marked or identified as gone and associated on the list with switches other than the selected switch identifier are deleted from the selected switch's forwarding table, using conventional SNMP, CLI, XML or other conventional techniques. An entry is identified as gone if the difference between the last retrieved timestamp and the current time exceeds the threshold. Step 244 may include logging into the selected network switch and logging out of any previously selected network switch.

To add an entry as a remote entry, or to reference an entry for deletion as a remote entry, a connection identifier may be used to associate an interface on the switch to the switch corresponding to the entry. The connection identifier references the connection from the perspective of the switch to which the remote entry is being added, or from which the remote entry is being deleted, to the next switch in the path to the device corresponding to the entry being added or deleted. The connection identifier is the identifier used by the switch to route communications, and it identifies, within the switch to which it is added, the connection to the switch supporting the device being added. In one embodiment, the connection identifier between the switch to which the entry is being added or from which the entry is being deleted, to another switch is the switch identifier of the other switch. However, other embodiments may use other connection identifiers, such as a port identifier corresponding to the other switch. In such embodiment, a translation table may be received as part of step 210 or 212 that relates the switch identifiers to the corresponding connection identifier for each switch and this translation table is used to convert the switch identifier in the entry to the remote connection identifier that is added with the device identifier to the forwarding table. Alternatively, each switch may have its own translation table, which may be retrieved from the switch and stored as part of step 214 in order to build the translation table. In this embodiment, the connection identifier is looked up using the switch identifier of both the switch to which the entry is being added, or from which the entry is being deleted, and the other switch to identify the connection identifier. A connection identifier may refer to a physical connection from the switch, or a virtual connection from the switch.

If there are more network switches 246, the next network switch identifier is selected 248 and the method continues at step 244 using the newly selected network switch. Again, it is noted that in one embodiment, all network switches are thus selected for modification in this manner, although fewer than all may be selected and modified in one embodiment.

Otherwise 246, entries marked as new are optionally unmarked on the list, entries marked or identified as gone (because the difference between the last retrieved timestamp and the current time exceeds the threshold) are optionally deleted from the list, and the next iteration of the method is scheduled 250, for example using a conventional UNIX chron command.

In one embodiment, the scheduled time is an amount of time that is not greater from the current time than the shortest amount of time non-static entries are held by any switch from which such entries may be retrieved as described herein, typically 3 minutes. If the number of switches grows to be sufficiently large that the process of retrieval and installation takes longer than the shortest amount of time that non-static entries are held by any switch from which such entries are retrieved as described herein, if such process cannot be sped up, the amount of time, the switches hold non static entries may be set to be longer on the switches, so that the scheduling can occur according to the rule described above.

If such scheduled time has not yet occurred 252, the operating system will wait 254 until the scheduled time. At such scheduled time 252, the method continues at step 212.

Figure 2B:
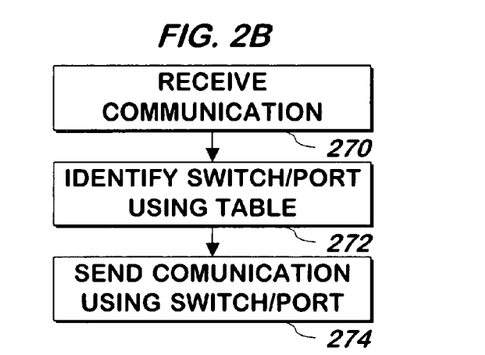
FIG. 2B is a flowchart illustrating a method of sending communications using the table updated as described with reference to FIG. 2A according to one embodiment of the present invention.

Referring now to FIG. 2B, a method of switching communications using the table updated as described above with reference to FIG. 2A is shown according to one embodiment of the present invention. A communication is received 270 from a device, such as a router. The communication may be received at a time that follows the timeout period of the forwarding table used to switch communications that was updated as described above with reference to FIG. 2A after an communication was sent or received from the destination specified in the communication.

The connection identifier corresponding to a switch that fronts to the network a destination device specified in the communication is identified 272 using a static table entry installed as described above. The conversion from the MAC address contained in the communication to the connection identifier may be performed using the forwarding table used by the switch. The present invention applies in environments in which virtual connections or physical connections are used and so the connection identifier may include the identifier of a virtual connection. The switch will translate the virtual connection to a physical connection using a table.

The communication is sent 274 to the identified switch using the port corresponding to the connection identifier, and is not flooded to other ports.

Figure 4:
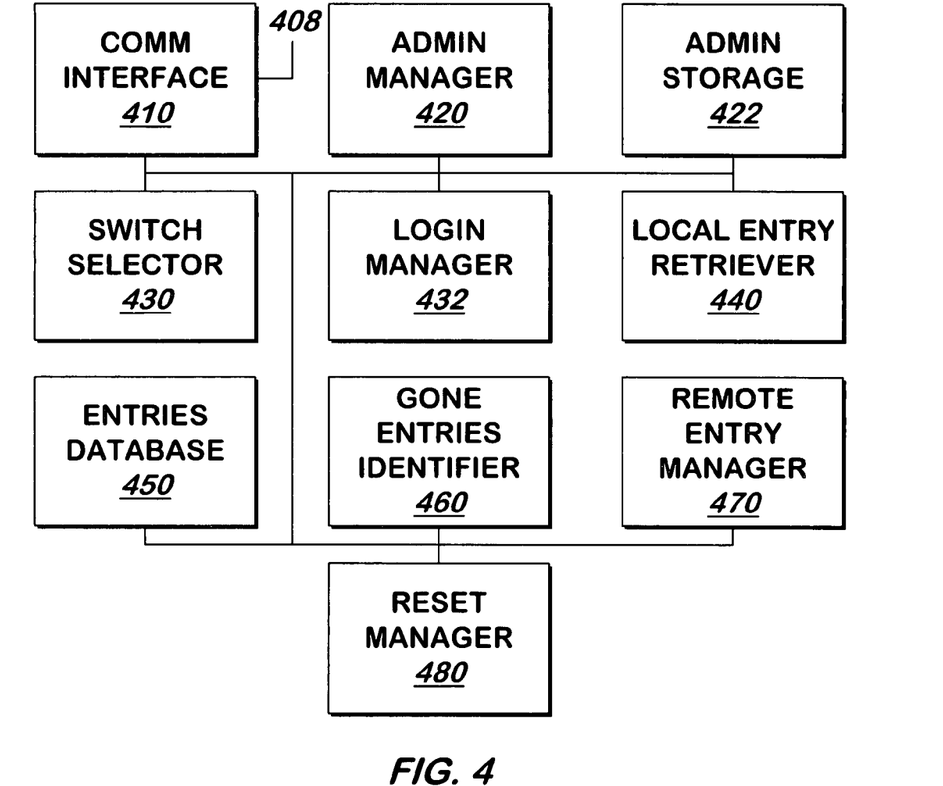
FIG. 4 is a block schematic diagram of a system for updating a table used to provide Ethernet communications according to one embodiment of the present invention.

Referring now to FIG. 4, a system for providing information to switches is shown according to one embodiment of the present invention. The system of FIG. 4 works in a network, such as that described in reference to FIG. 3, whereby messages are arranged to be repeatedly sent from devices through at least one switch in that network. The messages may be sent more frequently than the at least one switch would discard the forwarding information for each device that the switch retains as a result of messages transiting that switch.

Communication interface 410 is a conventional communication interface for communication with a local or wide area network such as an Ethernet, Internet or both, and runs suitable communications protocols such as TCP/IP or Ethernet protocols. All communication in or out of the system of FIG. 4 is made via input/output 408 of communication interface 410, which is coupled to the network under consideration, which may be an Ethernet network or other type of network. For example, input/output 408 may be coupled to any network switch 350, 354, 356, 358.

A system administrator may input to administration manager 420, or administration manager may use conventional techniques to discover, the management IP address for all switching devices under consideration, and administration manager 420 stores the management IP addresses of all switches in the network in administration storage 422. Administration storage 422 may include conventional memory or disk storage and may include a conventional database. In one embodiment, edge switches, those that communicate with devices outside the network of interest, are identified to administration manager 420 by the system administrator, and administration manager 420 marks such switches in administration storage 422. Or they may be discovered automatically by identifying as non-edge switches those switches that consistently don't report local entries after repeated queries for local entries as described herein. Edge switches may be any switches that define the edges of any network. In FIG. 3, edge switches may be network switches 350, 354, 356, 358. In another embodiment, edge switches are the local switches in FIG. 3. As noted below, other tiers of networks may be employed and the present invention can be independently applied to the edge switches of each tier.

When administration manager 420 has identified all of the management IP addresses of all of the edge switches, administration manager 420 signals switch selector 430.

Select and Connect to Switch

When so signaled, switch selector 430 sets a timer in the operating system (not shown) and when the timer elapses, switch selector 430 selects the first management IP address marked as an edge switch (e.g. one which fronts the network to one or more devices), in administration storage 422 and provides the management IP address to log in manager 432. Log in manager 432 accesses the switch having the management IP address it receives, logging in if necessary, for example, using conventional CLI techniques.

The log ins described herein are optional. It is not necessary to log in to the switch, as conventional SNMP or other techniques may be employed to perform the same switch information retrieval functions described herein without a log in.

In one embodiment, before logging into a switch, log in manager 432 logs out of any previously logged-in network switch. In one embodiment, the specific technique to use to log in or retrieve information for each switch may be identified by administration manager 420, having been received from the system administrator and stored in administration storage 422 by administration manager 420, or otherwise identified. In one embodiment, all possible techniques may be attempted by login manager 432 (in order of the most commonly used for a network) which stores the successful technique associated with the management IP address in administration storage 422. If such a technique is stored, switch selector 430 provides it to log in manager 432 with the management IP address and login manager 432 tries that technique first. When log in manager 432 accesses the switch, log in manager 432 provides the management IP address (and optionally an identifier of the technique that was used to log into, or otherwise access, the switch) and optionally, transfers any session to local entry retriever 440.

Retrieve and Store Local Entries; Mark New Ones.

When local entry retriever 440 receives the management IP address, local entry retriever 440 checks administration storage 422 to determine whether the switch identifier and MAC address of the switch are stored in administration storage 422. If not, local entry retriever 440 retrieves them from the switch and stores them associated with the management IP address of the switch. Local entry retriever 440 retrieves each or all of the local entries from the forwarding table of that switch, and retrieves the current date and time from the operating system (not shown). To perform such retrieval of the local entries, local entry retriever 440 may use the technique (e.g. CLI or SNMP) received from log in manager 432 or it may try various ones until a proper response is identified. Local entry retriever 440 locates in entries database 450 each of the entries corresponding to each of the local entries it retrieves from the device by device identifier (e.g. MAC address) and switch identifier (or switch management IP address). Entries database 450 includes conventional memory or disk storage and may or may not include a conventional database. The entries in entries database 450 each have a device identifier, identifier (switch identifier or switch management IP address) of the switch that provided the device identifier as a local entry, and date and time the device identifier was last retrieved as a local entry on the corresponding switch. Local entry retriever 440 updates the entry in entries database 450 for each device identifier corresponding to those it just retrieved by changing the date and time in the entry in entries database 450 to the current time just retrieved from the operating system.

Local entry retriever 440 adds to entries database 450 an entry for any device identifiers retrieved from the switch, but not in entries database 450, adding to each entry the switch identifier or management IP address of the switch that reported the device as a local entry, the device identifier, the date and time, and an indication that the device identifier is new to that switch. In one embodiment, the indication is the same date and time, but added to a field in the entry indicating when the device was identified as new.

When local entry retriever 440 has completed processing all of the local entries it retrieved as described herein, local entry retriever 440 signals switch selector 430.

When so signaled, switch selector 430 determines whether there are management IP addresses for more switches in administration storage 422. If so, switch selector 430 selects the next management IP address in administration storage 422 and repeats the process described above. If there are no more management IP addresses in administration storage 422, switch selector 430 signals gone entries identifier 460.

In one embodiment, the signal local entry retriever 440 provides switch selector 430 is the date and time it received, and before it selects the management IP address, switch selector 430 adds the date and time to the entry containing the most recently selected management IP address in administration storage 422. If log in manager 432 is not able to log in to, or otherwise access the information in, the switch, log in manager 432 signals switch selector 430, which attempts to locate the next management IP address in administration storage or signals gone entries identifier 460 as described above, but switch selector 430 does not update in administration storage 422 the date and time for the entry corresponding to the failed log in or access attempt. In one embodiment, when it selects switches as described above, switch selector 430 may select switches that were last logged into the earliest, for example, by ordering them in such order when first signaled by administration manager 420 and then using that order to make the selection.

Identify Gone Entries

When signaled, gone entry identifier 460 retrieves the current date and time from the operating system and identifies and marks in entries database 450 the entries in entries database 450 that have a date and time they were last retrieved as a local entry that precedes the current date and time by a threshold amount of time, the threshold being greater than zero, to allow for disconnects and reconnects of devices and the like.

In one embodiment, gone entry identifier 460 also identifies as gone an entry that has a device identifier that matches the device identifier in another entry with a different management IP address or switch identifier, but a newer date and time of last retrieval as a local entry.

When gone entry identifier 460 has completed marking all such entries as gone, gone entry identifier 460 signals switch selector 430. It is noted that gone entries need not be marked in advance of their use as described above, but can be so marked in one embodiment.

Connect and Install New Entries as Remote Entries, Delete Gone Entries

When signaled by gone entry identifier 460, switch selector 430 repeats the process of selecting switches one at a time and providing their management IP addresses (and optionally the first method of log in or access to try) to log in manager 432 as described above. However, all switches are used for selection, not just those at the edge of the network that front devices, and switch selector 430 also indicates to log in manager 432 that log in manager is to transfer control of the session, once logged in, to remote entry manager 470 each time a session is initiated. Log in manager 432 contacts, and optionally logs into the switch having the received management IP address (optionally identifying the technique to use as described above), provides the management IP address of the switch (and optionally, the technique), and transfers control of any session, to remote entry manager 470.

When it receives the management IP address (and optionally, the technique) remote entry manager 470 adds, optionally using any technique received, as one or more remote, static entries in the forwarding table of the logged on or otherwise contacted switch, one entry for each device identified as a new entry as described above and not received from the selected logged on or contacted switch, and deletes from that switch's forwarding table, entries corresponding to device identifiers marked as gone, and having switch identifiers different from the logged on or contacted switch, as described above. Translation may be accomplished between the switch identifier and the management IP address and vice versa as needed using the table relating one to the other.

The translation table described above is used by remote entry manager 470 to convert switch identifiers or management IP addresses to connection identifiers so that the other switch can be referred to using the connection identifier instead of the switch identifier or management IP address (although it is noted that in some embodiments, the switch identifier is the same as the connection identifier). Thus, if it is determined that switch A couples a new device to the edge of a network, the device identifier of the new device, and the connection identifier to switch A is installed in the forwarding table for each other switch in the network. For switch B, the device identifier of the new device, and switch B's connection identifier to switch A would be installed in the forwarding table of switch B. The translation table may be provided by a system administrator to administration manager 420, which stores it into administration storage 422, or it may be retrieved from each switch by login manager 432 and stored into administration storage. The translation table includes for each switch, the switch identifier and/or management IP address of the other switches, and the connection identifier used to reference that switch.

Remote entry manager 470 signals switch selector 430, in one embodiment, by providing the date and time it most recently retrieved. Switch selector 430 then repeats the process described above for each switch having a management IP address in administration storage 422 until all such switches have been processed in this manner.

In one embodiment, each time it receives the date and time from remote entry manager 470, before selecting a new switch (or determining there are no additional switches), switch selector 430 stores the current date and time of the most recently selected switch as the last update time in the corresponding entry in administration storage 422. If log in manager 432 cannot log in or otherwise access the information in the switch, it signals switch selector, indicating that the update is in progress, 430, which selects the next management IP address without updating the last update date and time for the one for which the log in or access attempt failed. In one embodiment, switches are selected for update in order of the oldest last update date and time in the same manner described above for the selection of edge switches.

In one embodiment, entries are determined to be new for a given switch (and therefore added to its forwarding table) if the date and time the entry was added is after the date and time the switch was last updated. Entries are deleted from the forwarding table of a given switch if the date and time the entry was identified as gone is after the last update time for that switch.

This allows the retrieval of local entries and any adjustments to be made to the remote entries using a single selection of each switch to perform retrieval and add or delete entries to and from the forwarding table in one embodiment. In such embodiment, login manager 440 may provide the management IP address (and optionally the technique) to local entry retriever 440, which operates as described above, looks up the switch identifier corresponding to that management IP address and then signals gone entries identifier 460 with the switch identifier corresponding to the management IP address most recently processed (and optionally the technique), and gone entries identifier 460 identifies gone entries as described above just for entries with switch identifier and then provides the switch identifier (and optionally, the technique) to remote entry manager 470, which operates as described above.

Unmark New Entries and Set Timer to Start Again.

In one embodiment, when switch selector 430 identifies no additional switches for remote entry manager to update as described above, switch selector 430 resets the timer it used as described above, and repeats the technique described above. In one embodiment, switch selector 430 also signals reset manager 480, which unmarks any entries in entries database 450 as new or gone for embodiments in which the date and time are not used for identification of new and/or gone entries.

EXAMPLE

Referring again to FIG. 3, the present invention will thus install device and switch information from a first switch, for example network switch 350, one that operates from the edge of a network of interest (the network of network switches 350-358) and is coupled to a device 312, onto a second switch 356 that may not have stored in its forwarding table information about that device 312, because no message from that device 312 has recently transited that second switch 356. When the second switch 356 receives a communication intended for the device 312, whereas the second switch 356 would have, in the absence of the installation of the information, sent the communication to more than one virtual or physical connection (a process referred to herein as "flooding") because of the installation of the device and switch information, the second switch 356 will forward the communication for the device over one virtual or physical connection, (or at least a fewer number of virtual or physical connections than it would have otherwise). If that device 312 is no longer reported by the reporting first switch 350, the device and switch information installed onto the second switch 356 will, if the lack of reporting persists for the threshold period of time, be removed from the second switch's forwarding table, allowing communications for that device 312 to be flooded by the second switch 356 or to be directed to a different switch to which the device 312 has been reconnected.

It is noted that the system and method may operate from any point in the network of FIG. 3, the system either being a part of any of the elements 312-364 shown, or being a separate device (not shown in FIG. 3) coupled to any such element 312-364 or the network 360.

It is noted that the local forwarding information need not be retrieved from every switch on the network. For example, some switches may not support end point devices. As noted, other switches may facilitate network plumbing operations, for example, operating on a different tier whose switches front none of the devices of interest to the network. For a network in which most of the switches on a single tier front the network to end point devices, like switch 350 fronts the network to devices 312-316, most of the network switches will be queried for their local entries.

As used herein, to "statically install" an entry in a device's forwarding table means to install it as a static entry.

Multi-Tier Networks

Figure 5:
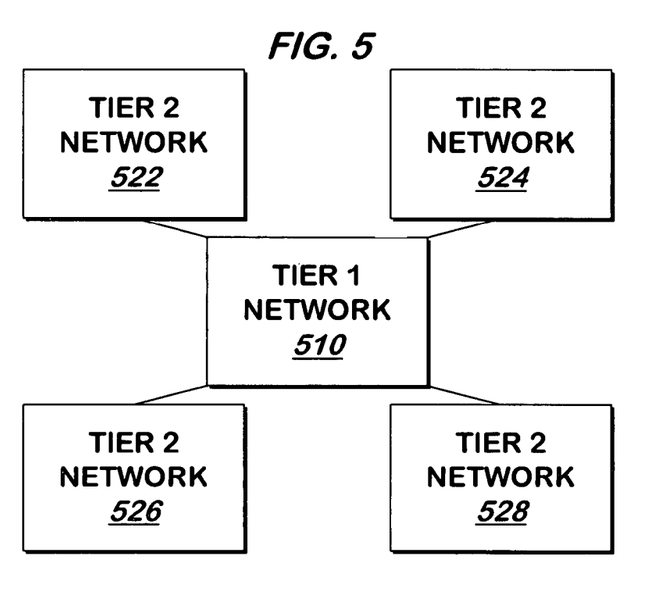
FIG. 5 is a block schematic diagram of a two tier network.

As noted, the present invention may be applied to multi-tier networks. FIG. 5 is an example network. The devices are omitted but would be coupled to the tier two networks 522-528. In this embodiment, regular messages, such as BGP messages are caused to flow over at least one switch in every tier to which the present invention would apply more frequently than the at least one switch through with each message flows would discard from its forwarding table the forwarding information for the device that sent the message. For example, route servers may be arranged so that the path from every device through at least one route server transits at least one switch of every network tier. For lower tier networks 522-528, the connection identifier to the higher tier network 510 can be used in place of a connection identifier from one lower tier network to any another on the same tier (e.g. 522 to 526).

The system and method of the present invention is applied and maintained as described above to each tier separately. There may be any number of tiers according to other embodiments of the present invention.

CONCLUSION

Thus, there has been described a method of, and computer program product for, installing second switching device information for devices coupled to a first switching device via at least one second switching device, including arranging for a plurality of messages to flow from each of the devices through at least one of the at least one second switching device to enable said at least one of the at least one second switching device to retain switching information regarding the devices for a period of time longer than said at least one of the at least one second switching device would retain said information solely from a single message sent from the devices, retrieving device forwarding information from at least one of the at least one second switching device, the device forwarding information being stored by the at least one second switching device due to a message corresponding to at least one of the devices having transited the switching device from which the device forwarding information was retrieved, the device forwarding information for at least one of the at least one device coupled to a network comprising the first switching device and the at least one second switching device not being stored on the first switching device, or for at least one of the at least one device not coupled to the network being stored on the first switching device, responsive to the device forwarding information retrieved, identifying as being in a first set of devices that may not be installed in the forwarding table of the first switching device, at least one device for which information was retrieved, but for which information is not already statically installed on the first switching device, and statically installing on the first switching device, for at least one of the at least one devices identified as being in the first set, at least one of a) at least one identifier of the at least one of the at least one device, responsive to said at least one of the at least one device being in the first set and b) an identifier corresponding to the second switching device from which device forwarding information for each said device was retrieved.

As an optional additional feature, the method and computer program product additionally includes, responsive to the device forwarding information retrieved, identifying as being in a second set, at least one device for which information was not retrieved and for which information is statically installed on the first switching device but the static installation is no longer valid, and for at least one of the at least one devices identified as being in the second set, removing from static installation on the first switching device at least one of a) any identifiers of one or more devices in the second set and b) the identifier of the second switching device from which device forwarding information for the device was not retrieved, at least in a recent time period.

Optionally, at least one selected from the retrieving, installing, and removing steps is performed via at least one command used to administer the first or second switching devices.

Optionally, the messages comprise BGP messages from a plurality of routers behind at least one of the at least one second switching devices.

Optionally, the first switching device and the at least one second switching device comprise Ethernet switching devices.

Optionally, at least some of the Ethernet switching devices are coupled to one another using a wide area network.

Optionally, the identifiers of at least one of the at least one devices in the first set and the at least one devices in the second set comprise MAC addresses.

Optionally, the first switching device and at least one second switching devices comprise one of a plurality of tiers of a network.

There has been disclosed a system for installing second switching device information for devices coupled to a first switching device via at least one second switching device, including a network arranged for a plurality of messages to flow from each of the devices through at least one of the at least one second switching device to enable said at least one of the at least one second switching device to retain switching information regarding the devices for a period of time longer than said at least one of the at least one second switching device would retain said information solely from a single message sent from the devices, a local entry retriever having an input/output coupled to the network for retrieving device forwarding information from at least one of the at least one second switching device, the device forwarding information being stored by the at least one second switching device due to a message corresponding to at least one of the devices having transited the switching device from which the device forwarding information was retrieved, the device forwarding information for at least one of the at least one device coupled to the network comprising the first switching device and the at least one second switching device not being stored on the first switching device, or for at least one of the at least one device not coupled to the network being stored on the first switching device, and for providing the device forwarding information at an output, a remote entry manager having an input coupled to the local entry retriever output for receiving the device forwarding information, the remote entry manager for, responsive to the device forwarding information retrieved, identifying as being in a first set of devices that may not be installed in the forwarding table of the first switching device, at least one device for which information was retrieved, but for which information is not already statically installed on the first switching device, and for statically installing on the first switching device via an input/output coupled to the first switching device, for at least one of the at least one devices identified as being in the first set, at least one of a) at least one identifier of the at least one of the at least one device, responsive to said at least one of the at least one device being in the first set and b) an identifier corresponding to the second switching device from which device forwarding information for each said device was retrieved.

The system may additionally include a gone entries identifier having an input coupled to the local entry retriever output for receiving the device forwarding information, the gone entries identifier for, responsive to the device forwarding information retrieved, providing at an output information identifying as being in a second set, at least one device for which information was not retrieved and for which information is statically installed on the first switching device but the static installation is no longer valid, and for at least one of the at least one devices identified as being in the second set, and the remote entry manager may additionally include a second input coupled to the gone entries identifier output for receiving the second set identifying information, and the remote entry manager may additionally be for removing from static installation on the first switching device at least one of a) any identifiers of one or more devices in the second set and b) the identifier of the second switching device from which device forwarding information for the device was not retrieved, at least in a recent time period, via the remote entry manager input/output.

The system of may include an optional feature, whereby the local entry retriever retrieves or the remote entry manager installs or removes via at least one command used to administer the first or second switching devices.

The system may include an optional additional feature, whereby the messages may include BGP messages from a plurality of routers behind at least one of the at least one second switching devices.

The system may include an optional additional feature, whereby the first switching device and the at least one second switching device comprise Ethernet switching devices.

The system may include an optional additional feature, whereby at least some of the Ethernet switching devices are coupled to one another using a wide area network.

The system may include an optional additional feature, whereby the identifiers of at least one of the at least one devices in the first set and the at least one devices in the second set comprise MAC addresses.

The system may include an optional additional feature, whereby the first switching device and at least one second switching devices comprise one of a plurality of tiers of a network.

What is claimed is:

1. A method of installing second switching device information for devices coupled to a first switching device via at least one second switching device, comprising:

arranging for a plurality of messages to flow from each of the devices through at least one of the at least one second switching device to enable said at least one of the at least one second switching device to retain switching information regarding the devices for a period of time longer than said at least one of the at least one second switching device would retain said information solely from a single message sent from the devices;

at a system coupled to the at least one second switching device via a network, retrieving device forwarding information from at least one of the at least one second switching device, the device forwarding information being stored by the at least one of the at least one second switching device due to a message corresponding to at least one of the devices having transited the at least one of the at least one second switching device from which the device forwarding information was retrieved, the device forwarding information for at least one of the devices coupled to the network comprising the first switching device and the at least one second switching device not being stored on the first switching device, or for at least one of the devices not coupled to the network being stored on the first switching device;

responsive to the device forwarding information retrieved, identifying as being in a first set of devices, at least one of the devices for which information was retrieved, but for which information is not already statically installed on the first switching device;

from the system via the network, statically installing on the first switching device, for at least one of the at least one devices identified as being in the first set, at least one of a) at least one identifier of the at least one of the devices, responsive to said at least one of the devices being in the first set and b) an identifier corresponding to the second switching device from which device forwarding information for each said device was retrieved;

responsive to the device forwarding information retrieved, identifying as being in a second set, at least one of the devices for which information was not retrieved and for which information is statically installed on the first switching device but the information statically installed is no longer valid; and for at least one of the at least one of the devices identified as being in the second set, removing from static installation on the first switching device at least one of a) any identifiers of one or more devices in the second set and b) the identifier of the second switching device from which device forwarding information for the device was not retrieved, at least in a recent time period.

2. The method of claim 1, wherein at least one selected from the retrieving, installing, and removing steps is performed via at least one command used to administer the first or second switching devices.

3. The method of claim 1, wherein the plurality of messages comprise BGP messages from a plurality of routers behind at least one of the at least one second switching devices.

4. The method of claim 1, wherein the first switching device and the at least one second switching device comprise Ethernet switching devices.

5. The method of claim 4, wherein at least some of the Ethernet switching devices are coupled to one another using a wide area network.

6. The method of claim 1, wherein the identifiers of at least one of the devices in the first set and the devices in the second set comprise MAC addresses.

7. The method of claim 1, wherein the first switching device and at least one second switching devices comprise one of a plurality of tiers of a network.

8. A system for installing second switching device information for devices coupled to a first switching device via at least one second switching device, comprising:

a network arranged for a plurality of messages to flow from each of the devices through at least one of the at least one second switching device to enable said at least one of the at least one second switching device to retain switching information regarding the devices for a period of time longer than said at least one of the at least one second switching device would retain said information solely from a single message sent from the devices;

a local entry retriever having an input/output coupled to the network for retrieving device forwarding information from at least one of the at least one second switching device, the device forwarding information being stored by the at least one of the at least one second switching device due to a message corresponding to at least one of the devices having transited the at least one of the at least one second switching device from which the device forwarding information was retrieved, the device forwarding information for at least one of the devices coupled to the network comprising the first switching device and the at least one second switching device not being stored on the first switching device, or for at least one of the devices not coupled to the network being stored on the first switching device, and for providing the device forwarding information at an output;

a remote entry manager having an input coupled to the local entry retriever output for receiving the device forwarding information, the remote entry manager for, responsive to the device forwarding information retrieved, identifying as being in a first set of devices, at least one of the devices for which information was retrieved, but for which information is not already statically installed on the first switching device, and for statically installing on the first switching device via an input/output coupled to the first switching device, for at least one of the at least one devices identified as being in the first set, at least one of a) at least one identifier of the at least one of the devices, responsive to said at least one of the devices being in the first set and b) an identifier corresponding to the second switching device from which device forwarding information for each said device was retrieved; and a gone entries identifier having an input coupled to the local entry retriever output for receiving the device forwarding information, the gone entries identifier for, responsive to the device forwarding information retrieved, providing at an output information identifying as being in a second set, at least one of the devices for which information was not retrieved and for which information is statically installed on the first switching device but the information statically installed is no longer valid, and for at least one of the at least one of the devices identified as being in the second set; and wherein:

the remote entry manager additionally comprises a second input coupled to the gone entries identifier output for receiving the second set identifying information; and the remote entry manager is additionally for removing from static installation on the first switching device at least one of a) any identifiers of one or more devices in the second set and b) the identifier of the second switching device from which device forwarding information for the device was not retrieved, at least in a recent time period, via the remote entry manager input/output.

9. The system of claim 8, wherein the local entry retriever retrieves or the remote entry manager installs or removes via at least one command used to administer the first or second switching devices.

10. The system of claim 8, wherein the plurality of messages comprise BGP messages from a plurality of routers behind at least one of the at least one second switching devices.

11. The system of claim 8, wherein the first switching device and the at least one second switching device comprise Ethernet switching devices.

12. The system of claim 11, wherein at least some of the Ethernet switching devices are coupled to one another using a wide area network.

13. The system of claim 8, wherein the identifiers of at least one of the devices in the first set and the devices in the second set comprise MAC addresses.

14. The system of claim 8, wherein the first switching device and at least one second switching devices comprise one of a plurality of tiers of a network.

15. A computer program product comprising a non transitory computer useable medium having computer readable program code embodied therein for installing second switching device information for devices coupled to a first switching device via at least one second switching device, the computer program product comprising non transitory computer readable program code devices configured to cause a computer system to:

arranging for a plurality of messages to flow from each of the devices through at least one of the at least one second switching device to enable said at least one of the at least one second switching device to retain switching information regarding the devices for a period of time longer than said at least one of the at least one second switching device would retain said information solely from a single message sent from the devices;

retrieve via a network, arranged so that a plurality of messages flow from each of the devices through at least one of the at least one second switching device to enable said at least one of the at least one second switching device to retain switching information regarding the devices for a period of time longer than said at least one of the at least one second switching device would retain said information solely from a single message sent from the devices, device forwarding information from at least one of the at least one second switching device, the device forwarding information being stored by the at least one of the at least one second switching device due to a message corresponding to at least one of the devices having transited the at least one of the at least one second switching device from which the device forwarding information was retrieved, the device forwarding information for at least one of the devices coupled to a network comprising the first switching device and the at least one second switching device not being stored on the first switching device, or for at least one of the devices not coupled to the network being stored on the first switching device;

responsive to the device forwarding information retrieved, identify as being in a first set of devices, at least one of the devices for which information was retrieved, but for which information is not already statically installed on the first switching device;

statically install on the first switching device, for at least one of the at least one devices identified as being in the first set, at least one of a) at least one identifier of the at least one of the devices, responsive to said at least one of the devices being in the first set and b) an identifier corresponding to the second switching device from which device forwarding information for each said device was retrieved;

responsive to the device forwarding information retrieved, identify as being in a second set, at least one of the devices for which information was not retrieved and for which information is statically installed on the first switching device but the information statically installed is no longer valid; and for at least one of the at least one of the devices identified as being in the second set, remove from static installation on the first switching device at least one of a) any identifiers of one or more devices in the second set and b) the identifier of the second switching device from which device forwarding information for the device was not retrieved, at least in a recent time period.

16. The computer program product of claim 15, wherein at least one selected from the retrieving, installing, and removing steps is performed via at least one command used to administer the first or second switching devices.

17. The computer program product of claim 15, wherein the plurality of messages comprise BGP messages from a plurality of routers behind at least one of the at least one second switching devices.

18. The computer program product of claim 15, wherein the first switching device and the at least one second switching device comprise Ethernet switching devices.

19. The computer program product of claim 18, wherein at least some of the Ethernet switching devices are coupled to one another using a wide area network.

20. The computer program product of claim 15, wherein the identifiers of at least one of the devices in the first set and the devices in the second set comprise MAC addresses.

21. The computer program product of claim 15, wherein the first switching device and at least one second switching devices comprise one of a plurality of tiers of a network.

\* \* \* \* \*